Patented July 12, 1949

2,476,053

UNITED STATES PATENT OFFICE 2,476,053

PROCESS FOR PRODUCING ESTERS

Samuel B. Lippincott, Westfield, N. J., assignor to Standard Oil Development Company, a corporation of Delaware No Drawing. Application January 2, 1947, Serial No. 719,924

12 Claims. (Cl. 260—491)

Heretofore the ester interchange reaction has been used to prepare esters of primary alcohols and when this method was used it was successful where monohydric alcohols were esterified.

The use of this reaction to prepare esters of secondary and tertiary alcohols is described in my copending application entitled "Ester exchange reaction," Serial No. 719,923, filed January 2, 1947. The present invention relates to the use of such ester interchange reactions for the preparation of esters from polyhydric compounds or compositions containing hydroxyl groups of different classes, i. e., containing at least two of the classes represented by hydroxyl groups connected with primary, secondary and tertiary carbon atoms.

Such polyhydric compounds are difficult to esterify by conventional methods where acids are used in the esterification reaction, because they are unstable to acids due to the presence of at least one secondary or tertiary hydroxyl group. The compounds containing a secondary or tertiary hydroxyl group have a strong tendency to dehydrate in the presence of acids to yield unsaturated compounds.

This invention applies both to mixtures of alcohols of different classes and to mixed polyhydric compounds, i. e., compounds containing at least two different classes of hydroxyl groups in the same molecule.

Heretofore it has been difficult to esterify all the hydroxyl groups in a mixed polyhydric compound and the selective esterification of the hydroxyl groups in a mixed polyhydric compound has not been considered feasible.

It has now been discovered that such mixtures of alcohols of different types and mixed polyhydric compounds can be esterified by an ester-interchange reaction, and all of the hydroxyl groups may be esterified or the primary or primary and secondary hydroxyl groups may be selectively esterified in the presence, respectively, of secondary or secondary and tertiary hydroxyl groups.

This invention has for an object the preparation of esters of polyhydric compounds.

This invention has for a further object the preparation of esters of mixed polyhydric compounds by an ester-interchange reaction in the presence of a neutral to basic catalyst.

Another object of this invention is to prepare esters of mixed polyhydric compound simply and efficiently with simple equipment.

Still another object of this invention is the esterification of a mixed polyhydric compound wherein each type of hydroxyl present may be esterified with a different acid radical.

Still another object of this invention is the selective esterification of primary hydroxyl groups in the presence of secondary and/or tertiary hydroxyl groups, and the selective esterification of secondary hydroxyl groups in the presence of tertiary hydroxyl groups in an ester-interchange reaction.

For the purpose of this description of the invention, hydroxyl groups linked directly to carbon atoms which are primary, secondary or tertiary, are classed, respectively, as primary, secondary and tertiary hydroxyl groups. It has been discovered that selective esterification of individual classes of such hydroxyl groups can be accomplished in compositions containing two or three different classes, by means of the ester-interchange reaction. It has been further discovered that this reaction proceeds at greatly different rates with different combinations of alcohols and esters and that by suitable selection of the ester the selectivity of the reaction can be controlled. It has been observed in general that alcohols can be esterified by the ester-interchange reaction with an ester of an alcohol of the same or a higher class, considering the classes of increasing order of rank, primary, secondary and tertiary. It has been further observed that alcohols are esterified in the ester-interchange reaction with esters of alcohols of lower class, only under much more severe conditions and at much slower reaction rates. By means of these observations, the above and other objects of this invention appearing hereinafter are accomplished by mixing and heating a mixture of alcohols or a mixed polyhydric compound having hydroxyl groups of different classes with an ester whereby one or more hydroxyl groups of the mixed polyhydric compound are esterified with the acid radical of the ester. If it is desired to esterify a primary hydroxyl in the mixed polyhydric compound the ester used is an ester of a primary alcohol and by this procedure only primary hydroxyls in the mixed polyhydric compound will be esterified. By heating the mixed polyhydric compound with an ester of a secondary alcohol, both primary and secondary hydroxyl groups can be esterified. By heating the mixed polyhydric compound with an ester of tertiary alcohol, all of the hydroxyl groups present in the polyhydric compound can be esterified. It is thus possible to esterify successively and selectively each class of hydroxyl groups in a polyhydric compound by the practice of this invention, that is, the class of primary hydroxyl groups may be first esterified using an ester of a primary alcohol in the ester-interchange reaction, followed by the esterification by the class of secondary hydroxyl groups by the use of an ester of a secondary alcohol and finally the esterification of the class of tertiary hydroxyl groups may be accomplished by using an ester of a tertiary alcohol. The classes of primary and secondary hydroxyl groups may be esterified by using an ester of a secondary alcohol and any tertiary hydroxyl groups present may then be esterified by mixing and heating the partial ester with an ester of a tertiary alcohol. Also, the primary hydroxyl groups present in a mixed polyhydric compound may be esterified by ester-interchange with an ester of a primary alcohol followed by an esterification of any secondary and tertiary hydroxyl groups present by mixing and heating the partial ester in which the primary hydroxyl groups have been esterified with an ester of a tertiary alcohol.

The hydroxyl groups in the alcohols discussed herein are preferably linked to aliphatic carbon atoms, i. e., a carbon atom which is part of a carbon chain, either open or cyclic, as in cyclohexanol, and including methanol. The esters likewise are such that upon saponification a similar aliphatic alcohol would be obtained. The term "hydroxyl group," as used in this description and the claims, is intended to refer to alcoholic groups, and does not include the OH group present in carboxylic groups.

*Example I.—2,3-dimethyl-1,3-butanediol-1-monoacetate*

2,3-dimethyl-1,3-butanediol (800 g.), isopropyl acetate (1000 cc.), and sodium (1.5 g.) were mixed in a flask and distilled using an efficient fractionating column. The take-off was regulated so that the vapor temperature did not rise above 83° C. The azeotrope of isopropyl alcohol and isopropyl acetate boils at 80° C. This azeotrope is made up of 48% isopropyl acetate and 52% isopropyl alcohol. At the end of an eight hour period the reaction mixture was allowed to cool. More isopropyl acetate (600 cc.) and sodium (1.5 g.) were added, and the distillation continued until it was no longer possible to keep the temperature below 83° C., except at total reflux. Distillation was continued slowly until vapor temperature reached 85° C. The mixture was cooled, filtered, and the filtrate distilled at reduced pressure. The main fraction (1013 g.) was collected at 50° to 125° at 10 mm. pressure. It had a saponification number of 314 mg. KOH/g. which indicates a purity of about 90%. On this basis the yield of pure product was 85%.

The crude product was fractionated using an efficient fractionating column. The main fraction (⅔ of the whole) was collected at 92–97° C. at 6 mm. pressure. The saponification number of this fraction was 349 mg. KOH/g. The theoretical saponification number for 2,3-dimethyl-1,3-butanediol-1-monoacetate is 350 mg. KOH/g.

*Example II.—2-methyl-2,4-pentanediol-4-monoacetate*

2-methyl-2,4-pentanediol (355 g. 3 moles), isopropyl acetate (1500 ml. redistilled, 87–89°) and sodium (2 g.) were charged into a flask and subjected to distillation while the rate of take-off was so regulated that the vapor temperature did not exceed 82°. In this way the azeotrope of isopropyl acetate and isopropyl alcohol was removed from the reaction mixture. The reaction was carried out in eight-hour periods. At the end of each period the mixture was allowed to cool and more sodium (2–2.5 g.) was added. The total reaction time was five periods (40 hours). More isopropyl acetate (500 ml.) was added after the third period. The reaction mixture was filtered and distilled at reduced pressure collecting the product (428 g.) from 50° at 5 mm. to 50° at 1 mm. This product had a saponification number of 397.4 mg. KOH/g. as compared to a theoretical value of 350 for the monoacetate. This indicates that some diacetate was produced. Considering the product to be the monoacetate, the yield was 90% on the basis of the glycol. A portion of the product was fractionated carefully. The first fraction (after a prefraction had been discarded) which distilled at 87–90° at 15 mm., had an index of refraction, $N_D^{20}$, of 1.4272 and a saponification equivalent of 340 mg. KOH/g. Toward the end of the distillation, a fraction was collected at 87°, 10 mm., having an index of refraction of 1.4227 and a saponification equivalent of 535 mg. KOH/g. The theoretical saponification number for the monoacetate is 350 and for the diacetate, 555.

Thus the product contained approximately 80% of the monoacetate and 10% of the diacetate. The 2-methyl-2,4 pentane diol-4-monoacetate was obtained in much the largest yield, and the diacetate in relatively small yield, indicating the much slower reaction of the tertiary hydroxyl group.

*Example III.—3-methyl-1,3-butanediol-1-monopropionate*

A flask was charged with 3-methyl-1,3-butanediol (146 g.), methyl propionate (500 g.), and sodium (1 g.). The mixture was distilled using an efficient fractionating column at such a reflux ratio that the vapor temperature at the top of the column was maintained below 65° C. Finally the temperature tended to rise above 65° C. even at total reflux. Distillation was continued at a high reflux ratio until the vapor temperature rose to 78° C. The residue was taken up in ether and filtered. The ether was removed by distillation at atmospheric pressure, and the product distilled at reduced pressure. Two fractions were collected: (1) 64–70° C. at about 3 mm. pressure 77 g.; saponification number 340 and (2) 70–92° C. at about 3 mm. pressure, 77 g.; saponification number 284. The theoretical saponification number of 3-methyl-1,3-butanediol-1-monopropionate is 350.

*Example IV.—2-methyl-2,4-pentanediol diacetate*

2-methyl-2,4-pentanediol (118.2 g.) and tertiary butyl acetate (384.5 g.) were charged into a flask equipped with a packed column. A small amount of tertiary butyl acetate was distilled in order to insure anhydrous conditions in the reaction pot. Sodium methoxide (2 g.) was added, and the distillation continued at a reflux ratio sufficient to keep the vapor temperature below 85°. After four hours, more catalyst (½ g.) was added. The reaction was continued for four periods of eight hours each, adding a small amount (½ g.) of sodium methoxide at the beginning of each period. At the beginning of the next to last period more tertiary butyl acetate (116 g.) was added. Finally the vapor temperature could no longer be kept below 85° C. The excess tertiary butyl acetate was then recovered by distillation. The residue was transferred to a smaller flask equipped with a Vigreaux column. Distillation was continued at reduced pressure. The main fraction (133 g., yield—66%) was collected at 63-67° C. at 1-2 mm. pressure. This was redistilled using a packed column, cutting the product into several fractions. Except for the small prefraction, these fractions had saponification numbers that varied from 540 to 567. The theoretical saponification number of 2-methyl-2,4-pentanediol diacetate is 555.

In the preparation of esters of mixed polyhydric compounds by selective esterification of one or two classes of hydroxyls, followed by an esterification of the remaining classes of hydroxyls, a partial ester is formed as an intermediate product in which only one or two of the classes of hydroxyls present have been esterified. This partial ester may be isolated and purified by distillation before proceeding to the esterification of the remaining hydroxyls present, or the partial esters may be used in the crude form in an ester-interchange reaction wherein the one or more of the remaining hydroxyls are esterified.

The distillation procedure used in the purification of the esters formed by the ester-interchange reaction depends upon the physical properties of the ester formed. In some cases, a steam distillation is possible and in other cases it is necessary to fractionally distill.

By the practice of this invention it is possible to introduce different acid radicals into the mixed polyhydric compound and where the mixed polyhydric compound contains hydroxyls of all three classes it is possible to have each class of hydroxyl groups esterified with a different acid radical, or to have any two classes of hydroxyls esterified with different acid radicals. When only two classes of hydroxyl groups are present in a mixed polyhydric compound it is possible to esterify each class with a different acid radical.

The term mixed polyhydric compound as used herein refers to a compound containing two or more hydroxyl groups in which the hydroxyl groups are not all of the same class, i. e., they are not all primary, secondary or teritary hydroxyl groups. The term partial ester, refers to a mixed polyhydric compound in which only part of the hydroxyl groups present have been esterified.

This invention may also be applied to mixtures containing two or more different classes of alcohols such as mixtures containing at least two of the classes of primary, secondary and tertiary alcohols. In this manner, selective esterification of particular classes of such alcohols may be accomplished by subjecting such mixtures to the ester exchange reaction with suitable esters in the same manner used in the above examples for the treatment of the mixed polyhydric compounds. Thus, in a mixture containing primary alcohols and also secondary and/or tertiary alcohols, the primary alcohols may be selectively esterified and the resulting esters may thus be separated from the unesterified secondary and/or tertiary alcohols by differences in solubility, boiling point or other physical properties according to known methods. Similarly, primary and secondary alcohols may be selectively esterified in a mixture containing also tertiary alcohols and the resulting esters may then be separated from the tertiary alcohols by known methods. Also, all three classes of alcohols may be esterified in the mixture by ester-exchange with an ester of a tertiary alcohol, as illustrated above in Example IV. Such selective esterification of primary alcohols may be used, for example, to separate a mixture of ethyl and isopropyl alcohols by selectively esterifying the ethyl alcohol with an ester of a primary alcohol such as methyl acetate, propionate, butyrate, etc., and then separating the resulting ethel ester from the unesterified isopropyl alcohol. The ester may be used as obtained or saponified to recover the ethyl alcohol if separation of the ethyl and isopropyl alcohols was the primary purpose. Such separations are particularly advantageous, for example, in working up synthesized mixtures of alcohols resulting from hydrocarbon oxidation and from the so-called Fischer synthesis by which alcohols and other oxy-organic compounds, as well as hydrocarbons, are synthesized from carbon monoxide and hydrogen, if desired, in the presence of olefins which also promote the formation of oxy-organic compounds. The crude products obtained from such syntheses may be treated directly by the present invention, as may concentrates and fractions obtained from the crude products, as by extraction with water to separate the water-soluble alcohols, distillation to separate narrow-boiling cuts of the product and of water-soluble alcohols and water-insoluble alcohols obtained therefrom.

I claim:

1. A process for selective esterification of secondary hydroxyl groups in an aliphatic glycol containing both secondary and tertiary hydroxyl groups linked to aliphatic carbon atoms which comprises mixing together and heating in the presence of a neutral to basic ester-exchange catalyst the said glycol and an ester of a secondary aliphatic alcohol different from and more volatile than said glycol, removing a distillate containing said secondary aliphatic alcohol during said heating operation whereby said secondary hydroxyl group is selectively esterified and stopping the reaction before a substantial portion of the tertiary hydroxyl group is esterified.

2. A process for the preparation of 2-methyl-2,4-pentanediol-4-monoacetate which comprises mixing together and heating in the presence of sodium substantially anhydrous 2-methyl-2,4-pentanediol and isopropyl acetate, removing a distillate containing isopropyl alcohol during said heating operation whereby the secondary hydroxyl of said pentanediol is selectively esterified without substantial esterification of its tertiary hydroxyl group and stopping the reaction to obtain a product comprising 2-methyl-2,4-pentanediol-4-monoacetate.

3. A process for esterification of both secondary and tertiary hydroxyl groups in an aliphatic glycol containing both of said classes of hydroxyl groups linked to aliphatic carbon atoms which comprises mixing together and heating in the presence of a neutral to basic ester-exchange catalyst the said glycol and an ester of an aliphatic tertiary alcohol which is more volatile than said glycol, removing a distillate containing said tertiary alcohol during said heating operation whereby both of said secondary and tertiary hydroxyl groups are esterified.

4. A process for preparing 2-methyl-2,4-pentanediol-diacetate which comprises mixing together and heating in the presence of sodium methoxide substantially anhydrous 2-methyl-2,4-pentanediol and tertiary butyl acetate, said heating being conducted under reflux to keep the vapor temperature below 85° C. whereby both the secondary and tertiary hydroxyl groups in said pentane diol are esterified, then distilling excess tertiary butyl acetate from said reaction mixture and recovering therefrom a product comprising 2-methyl-2,4-pentanediol diacetate.

5. A process for esterification of an aliphatic glycol containing both secondary and tertiary hydroxyl groups linked to aliphatic carbon atoms which comprises mixing together and heating in the presence of a neutral to basic ester exchange catalyst, the said glycol and an ester of an aliphatic alcohol of a class at least as high as the class of one of the hydroxyl groups of said glycol and different from and more volatile than said glycol, removing a distillate containing said aliphatic alcohol during said heating operation whereby at least one class of the hydroxyl groups of said glycol is esterified.

6. A process for making an ester which comprises mixing together and heating in the presence of a neutral to basic ester-exchange catalyst, an aliphatic glycol containing two hydroxyl groups linked to aliphatic carbon atoms, one of which hydroxyl groups is a tertiary hydroxyl group and the other is selected from the group consisting of primary and secondary hydroxyl groups, and an ester of an aliphatic alcohol different from any alcohol in said composition and of a class at least as high as the class of one of said hydroxyl groups but lower than the class of another of said hydroxyl groups, whereby the lowest class of hydroxyl group is selectively esterified and stopping the reaction before a substantial portion of the highest class of hydroxyl group is esterified.

7. A process for making an ester which comprises mixing together and heating in the presence of an alcoholate of an alkali metal, an aliphatic glycol containing two hydroxyl groups of different classes linked to aliphatic carbon atoms, one of which hydroxyl groups is a tertiary hydroxyl group and the other is selected from the group consisting of primary and secondary hydroxyl groups, and an ester of an aliphatic alcohol different from any alcohol in said composition and of a class at least as high as the class of one of said hydroxyl groups but lower than the class of another said hydroxyl groups, whereby the lowest class of hydroxyl group is selectively esterified and stopping the reaction before a substantial portion of the highest class of hydroxyl group is esterified.

8. A process for making an ester which comprises mixing together and heating in the presence of an alcoholate of an alkaline earth metal, an aliphatic glycol containing two hydroxyl groups of different classes linked to aliphatic carbon atoms, one of which hydroxyl groups is a tertiary hydroxyl group and the other is selected from the group consisting of primary and secondary hydroxyl groups, and an ester of an aliphatic alcohol different from any alcohol in said composition and of a class at least as high as the class of one of said hydroxyl groups but lower than the class of another of said hydroxyl groups, whereby the lowest class of hydroxyl group is selectively esterified, and stopping the reaction before a substantial portion of the highest class of hydroxyl group is esterified.

9. A process for making an ester which comprises mixing together and heating in the presence of a basic ester-exchange catalyst, an aliphatic glycol, containing two hydroxyl groups of different classes linked to aliphatic carbon atoms, of which hydroxyl groups is a tertiary hydroxyl group and the other is selected from the group consisting of primary and secondary hydroxyl groups, and an ester of an aliphatic alcohol different from any alcohol in said composition and of a class at least as high as the class of one of said hydroxyl groups but lower than the class of another of said hydroxyl groups, whereby the lowest class of hydroxyl group is selectively esterified and stopping the reaction before a substantial portion of the highest class of hydroxyl group is esterified.

10. A process for successively and selectively esterifying hydroxyls of more than one class in an aliphatic glycol containing two different classes of hydroxyl groups linked to aliphatic carbon atoms, one of which hydroxyl groups is a tertiary hydroxyl group and the other is selected from the group consisting of primary and secondary hydroxyl groups, which comprises mixing together and heating in the presece of a neutral to basic ester-exchange catalyst, the said glycol with an ester of an aliphatic alcohol of a class equal to the lowest class of the hydroxyl groups in said glycol to form a partial ester with said lowest class hydroxyl group, mixing together and heating in the presence of a neutral to basic ester-exchange catalyst, the said partial ester with an ester of a tertiary alcohol.

11. A process for successively and selectively esterifying hydroxyls of more than one class in an aliphatic glycol containing two different classes of hydroxyl groups linked to aliphatic carbon atoms, one of which hydroxyl groups is a tertiary hydroxyl group, and the other is selected from the group consisting of primary and secondary hydroxyl groups, which comprises mixing together and heating in the presence of a neutral to basic ester-exchange catalyst the said glycol and an ester of an aliphatic alcohol of a class lower than the highest class of hydroxyl but not lower than the lowest class of hydroxyl in the glycol to form a partial ester with the lower class hydroxyl, then mixing together and heating in the presence of a neutral to basic ester-exchange catalyst, the said partial ester with an ester of a tertiary alcohol.

12. A process for esterification of an aliphatic glycol containing both primary and tertiary hydroxyl groups linked to aliphatic carbon atoms which comprises mixing together and heating in the presence of a neutral to basic ester-exchange catalyst the said glycol and an ester of an aliphatic alcohol of a class at least as high as the class of one of the hydroxyl groups of said glycol and different from and more volatile than said glycol, removing a distillate containing said aliphatic alcohol during said heating operation whereby at least one class of the hydroxyl group of said glycol is esterified.

SAMUEL B. LIPPINCOTT.

REFERENCES CITED

The following references are of record in the file of this patent:

UNITED STATES PATENTS

| Number | Name | Date |
| --- | --- | --- |
| 1,433,308 | Steffens | Oct. 24, 1922 |
| 2,072,806 | Wood | Mar. 2, 1937 |

FOREIGN PATENTS

| Number | Country | Date |
| --- | --- | --- |
| 421,063 | Great Britain | Dec. 13, 1934 |